United States Patent
Saliceti et al.

(10) Patent No.: US 6,662,165 B1
(45) Date of Patent: Dec. 9, 2003

(54) ELECTRONIC PRICE LABEL SYSTEM PROMOTIONAL INFORMATION VERIFIER

(75) Inventors: Joseph Saliceti, Alpharetta, GA (US); Terry L. Zimmerman, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 683 days.

(21) Appl. No.: 09/144,947

(22) Filed: Sep. 1, 1998

(51) Int. Cl.$^7$ .............................................. G06F 17/60
(52) U.S. Cl. ........................................ 705/20; 705/16
(58) Field of Search ............................. 705/20, 16, 1, 705/400, 27; 235/383

(56) References Cited

U.S. PATENT DOCUMENTS

| | | | |
|---|---|---|---|
| 4,002,886 A | | 1/1977 | Sundelin ................ 235/61.7 R |
| 4,500,880 A | | 2/1985 | Gomersall et al. ..... 340/825.35 |
| 4,825,045 A | | 4/1989 | Humble ..................... 235/383 |
| 4,924,363 A | | 5/1990 | Kornelson .................. 362/125 |
| 5,172,314 A | | 12/1992 | Poland et al. .............. 364/401 |
| 5,198,644 A | | 3/1993 | Pfeiffer et al. ............. 235/383 |
| 5,382,779 A | * | 1/1995 | Gupta ........................ 235/383 |
| 5,448,226 A | | 9/1995 | Failing, Jr. et al. ..... 340/825.35 |
| 5,461,561 A | | 10/1995 | Ackerman et al. ......... 364/401 |
| 5,465,085 A | | 11/1995 | Caldwell et al. ....... 340/825.35 |
| 5,493,107 A | * | 2/1996 | Gupta et al. ............... 235/383 |
| 5,572,653 A | | 11/1996 | DeTemple et al. .......... 395/501 |
| 5,583,487 A | | 12/1996 | Ackerman et al. ..... 340/825.35 |
| 5,771,005 A | * | 6/1998 | Goodwin, III ......... 340/825.35 |
| 5,793,029 A | * | 8/1998 | Goodwin, III .............. 235/483 |
| 5,794,211 A | | 8/1998 | Goodwin ..................... 705/23 |
| 5,870,714 A | * | 2/1999 | Shetty et al. ................ 705/20 |
| 5,907,143 A | * | 5/1999 | Goodwin, III .............. 235/383 |
| 5,914,670 A | * | 6/1999 | Goodwin, III et al. . 340/825.52 |
| 5,933,813 A | * | 8/1999 | Teicher et al. ............... 705/26 |
| 5,943,654 A | * | 8/1999 | Goodwin, III et al. ....... 705/14 |
| 6,012,040 A | * | 1/2000 | Goodwin, III .............. 705/20 |
| 6,047,263 A | * | 4/2000 | Goodwin, III .............. 705/20 |
| 6,073,843 A | * | 6/2000 | Goodwin, III et al. ..... 235/383 |

FOREIGN PATENT DOCUMENTS

| | | |
|---|---|---|
| EP | 0749082 A1 * | 12/1996 |
| EP | 0749091 A2 * | 12/1996 |
| EP | 0833297 A2 * | 4/1998 |
| EP | 0834854 A2 * | 4/1998 |

OTHER PUBLICATIONS

Zimmerman, Denise, "Electronic Sticker Shock: Retailers say cost is still a drawback to broader acceptance of electronic shelf labels," Supermarket News, Sep. 18, 1995, v45, n38, 3pp.*

* cited by examiner

*Primary Examiner*—Marc Norman
(74) *Attorney, Agent, or Firm*—Paul W. Martin; Priest & Goldstein, PLLC

(57) ABSTRACT

An electronic price label (EPL) promotional information verification system which ensures that promotional information for an item obtained from a promotional information file is equal to other promotional information displayed by an electronic price label (EPL) for the item. The EPL promotional information verification system includes a computer system coupled to the EPL, which includes a computer terminal and a storage medium coupled to the terminal. The storage medium contains an EPL data file, which contains EPL identification information and an EPL promotional information verifier. The computer terminal executes a promotional information verification program which reads the promotional information file to obtain the promotional information for the item, calculates another promotional information verifier from the promotional information in the promotional information file, reads EPL data file to obtain the one promotional information verifier, compares the one and the other promotional information verifiers to determine whether they are equal, and changes the displayed promotional information to the promotional information in the promotional information file if the one and the other promotional information verifiers are different.

21 Claims, 3 Drawing Sheets

ELECTRONIC PRICE LABEL SYSTEM PROMOTIONAL INFORMATION VERIFIER

The present invention is related to the following commonly assigned and U.S. patent applications and U.S. patents:

U.S. Pat. No. 5,914,670, issued Jun. 22, 1999, titled "Method Of Assigning Promotional Messages To Electronic Price Labels", filed Sep. 25, 1996, invented by Goodwin, and having Ser. No. 08/721,602.

U.S. Pat. No. 5,907,143, issued May 25, 1999, titled "Method Of Displaying A Promotional Message By An Electronic Price Label", filed Oct. 7, 1996, invented by Goodwin, and having Ser. No. 08/726,596.

U.S. Pat. No. 5,943,654, issued Aug. 24, 1999, titled "Method Of Displaying Promotional Messages Electronic Price Labels", filed Dec. 9, 1996, invented by Goodwin, and having Ser. No. 08/766,388.

"System and Method of Processing Promotional information From A Host Computer for Display on an Electronic Price Label", filed Apr. 25, 1997, invented by R. Berman et al., having Ser. No. 08/846,161, and now abandoned.

BACKGROUND OF THE INVENTION

The present invention relates to electronic price label (EPL) systems, and more specifically to an electronic price label system promotional information verifier.

EPL systems typically include a plurality of EPLs for each merchandise item in a transaction establishment. EPLs typically display the price of corresponding merchandise items on transaction establishment shelves and are typically attached to a rail along the leading edge of the shelves. A transaction establishment may contain thousands of EPLs to display the prices of the merchandise items. The EPLs are coupled to a central server from where information about the EPLs is typically maintained in an EPL, data file. Price information displayed by the EPLs is obtained from the PLU file.

Retailers typically want to display more than the price on EPLs. In the case of a "sale" or other special promotion, a retailer may wish to display promotional information such as, "WAS 1.69/SAVE 0.30", "BUY ONE, GET ONE", "SPECIAL PRICE". Promotional information may be stored in a price file or in a separate file.

Customers may become confused if promotional information displayed by an EPL is inconsistent with current sales terms.

Therefore, it would be desirable to provide a method of checking promotional information displayed by EPLs, and removing or changing the promotional information, if it is inconsistent with current sales terms.

SUMMARY OF THE INVENTION

In accordance with the teachings of the present invention, an electronic price label (EPL) system promotional information verifier is provided.

The EPL promotional information verification system includes a computer system coupled to the EPL, which includes a terminal and a storage medium coupled to the terminal. The storage medium contains an EPL data file, which contains EPL identification information and an EPL promotional information verifier. The computer terminal executes a promotional information verification program which reads the promotional information file to obtain promotional information for the item, calculates another promotional information verifier from the promotional information in the promotional information file, reads EPL data file to obtain the one promotional information verifier, compares the one and the other promotional information verifiers to determine whether they are equal, and changes the displayed promotional information to the promotional information in the promotional information file if the one and the other promotional information verifiers are different.

The method of the present invention includes the steps of reading an electronic price label data file to obtain identification information and a promotional information verifier for the item, reading the promotional information file to obtain the promotional information for the item, calculating another promotional information verifier from the promotional information in the promotional information file, comparing the one and the other promotional information verifiers to determine whether they are equal, and changing the displayed promotional information to the promotional information in the promotional information file if the one and the other promotional information verifiers are different.

It is accordingly an object of the present invention to provide an EPL system promotional information verifier.

It is another object of the present invention to provide an EPL system promotional information verifier for comparing information displayed by EPLs with information in a promotional information file.

It is another object of the present invention to provide an EPL system promotional information verifier for replacing or removing information displayed by EPLs if it is inconsistent with current sales terms.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
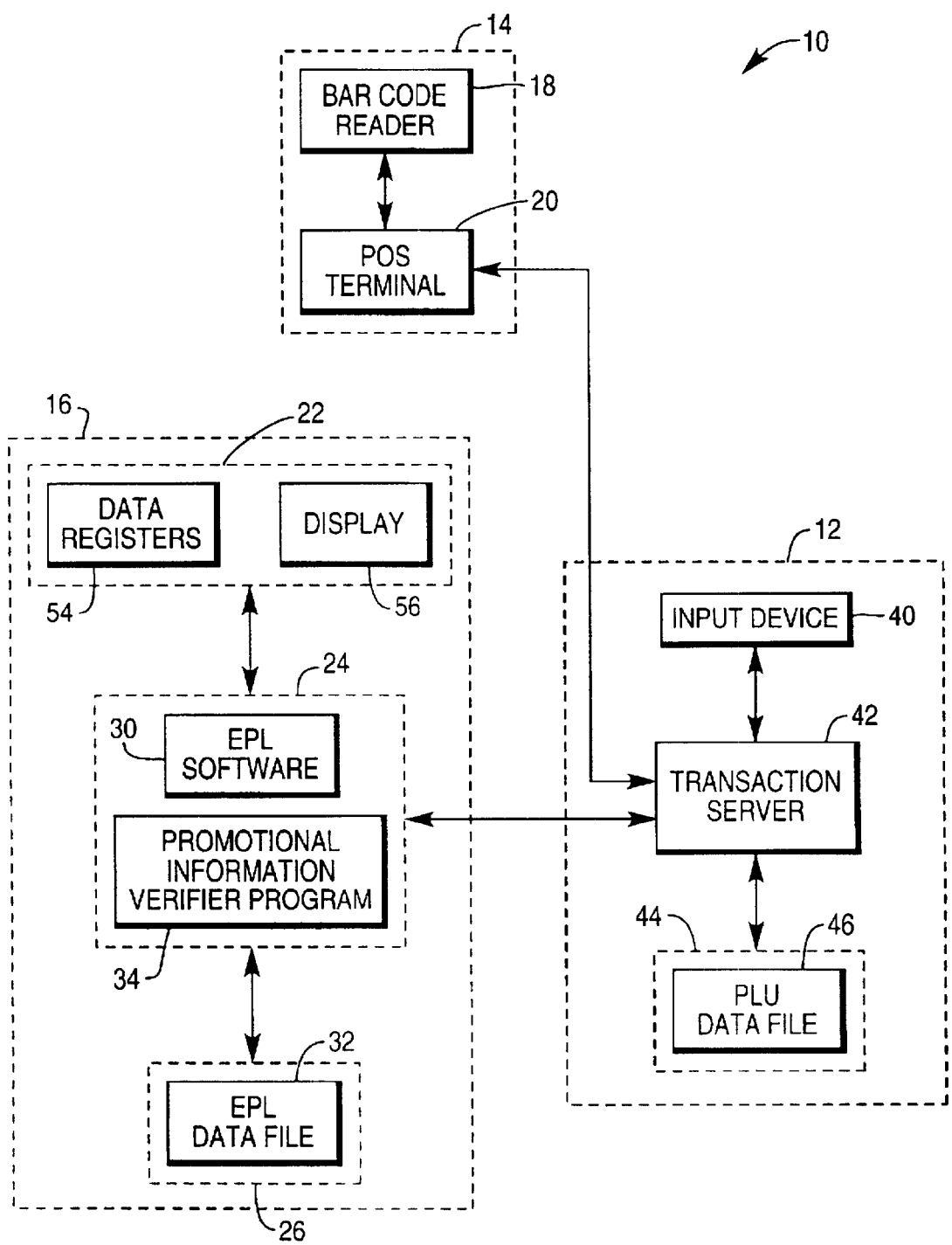
FIG. 1 is a block diagram of transaction system including an EPL system.

Referring now to FIG. 1, transaction system 10 primarily includes host computer system 12, point-of-sale (POS) system 14, and EPL system 16. Here, components 12 and 14 are shown as separate components that are networked together, but they may also form a single component. Thus, host computer system 12 may be a POS terminal which doubles as a host computer for network of other POS terminals.

POS system 14 includes bar code reader 18 and terminal 20.

EPL system 16 primarily includes EPLs 22, host EPL terminal 24, and EPL storage medium 26.

EPLs 22 each include data registers 54 and a display 56. Data registers 54 contain data, usually price data and promotional information, sent from EPL software 30. The data is displayed by displays 56.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting messages to EPLs 22. The messages may contain price and promotional information from price look-up (PLU) file 46. EPL software 30 obtains prices and promotional information in PLU data file 46 as they are entered using input device 40 (immediate processing) or after they have been stored within PLU data file 46.

EPL terminal 24 also executes EPL promotional information verifier software 34. EPL promotional information verifier software 34 compares promotional information displayed by an EPL to reference promotional information stored within a promotional information file. Here, reference promotional information is stored within PLU data file 46, but it may stored within another file or a separate file as well, in PCS system 14 or EPL system 16.

EPL storage medium 26 stores EPL data file 32. EPL storage medium 26 and is preferably a fixed disk drive.

EPL data file 32 contains EPL identification information and checksum information. Checksum may be price checksum information calculated from a corresponding price in PLU data file 46 and/or promotional information in PLU data file 46. EPL data file 32 contains information currently displayed by EPLs 22.

Host computer system 12 includes PLU storage medium 44, transaction server 42, and input device 40.

Transaction server 42 handles price requests from POS terminal 20 and EPL system 16. POS terminal 20 sends item identification information to transaction server 42 and transaction server 42 returns the corresponding price from PLU data file 46. EPL system 16 preferably obtains prices and promotional information from PLU data file 46, but may alternatively obtain promotional information from some other source file.

PLU storage medium 44 stores PLU data file 46. PLU data file 46 is available for distribution to POS terminal 20 and EPL system 16. Provision may be made for direct access to PLU data file 46 by bar code reader 18 or EPL terminal 24.

Figure 2:
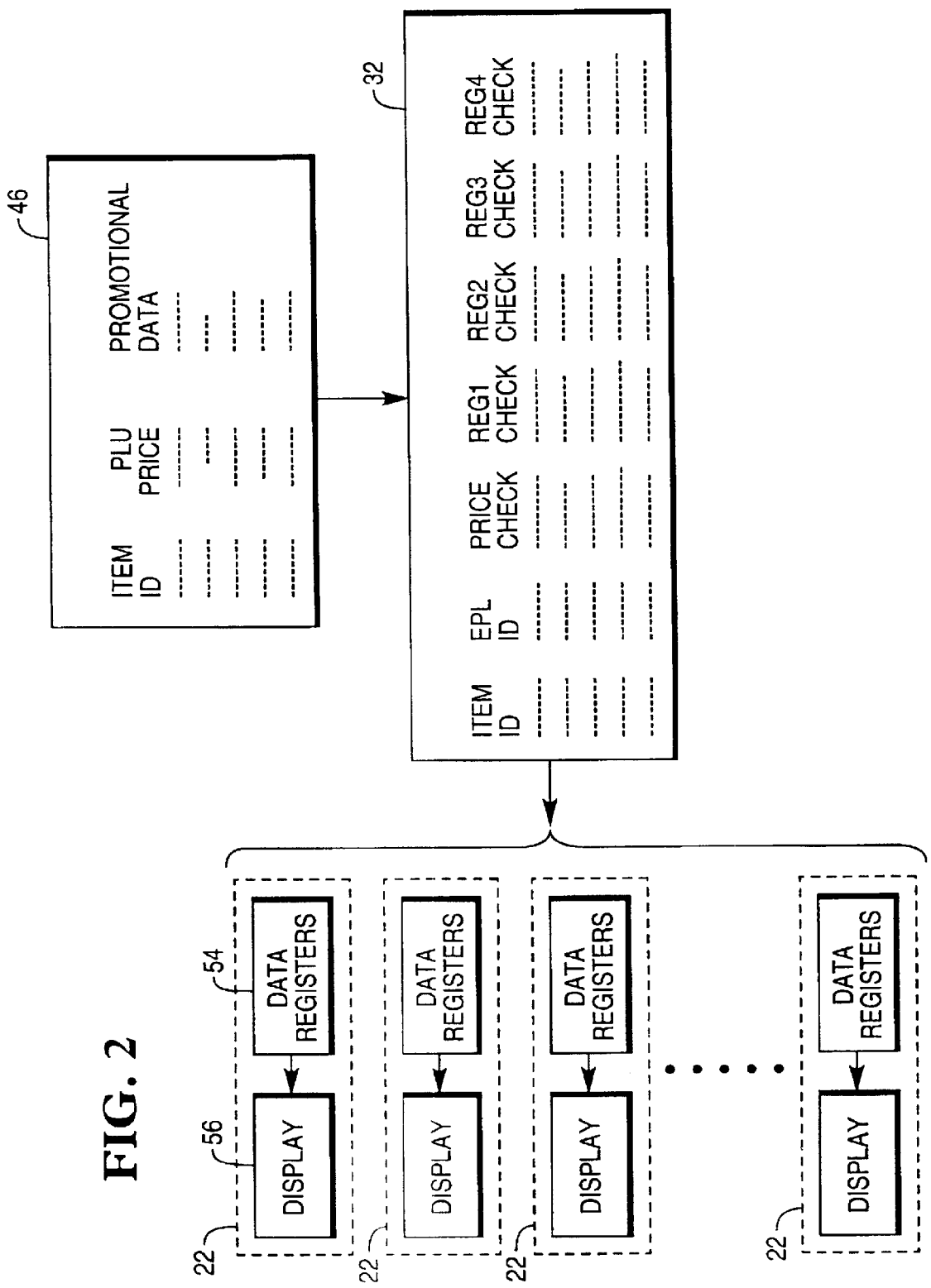
FIG. 2 is a diagram showing data files used within a transaction establishment.

Turning now to FIG. 2, EPL data file 32 and PLU data file 46 are shown in more detail.

EPL data file 32 includes a line entry for each EPL 22 in EPL system 16. Each line entry has an item identification entry (ITEM ID), an EPL identification entry (EPL ID), a price checksum value entry (PRICE CHECK), and register checksum values (REG1 CHECK through REG4 CHECK) for each of data registers 54. EPL 22 has four data registers 54, but other numbers of data registers 54 are also envisioned.

Entry ITEM ID identifies a store item. Entry EPL ID identifies which EPL is assigned to the item. Entry PRICE CHECK is a checksum value of the price. Entries REG1 CHECK through REG4 CHECK are checksums of their register contents. The fourth data register 54 contains promotional information, although other data registers, 54 may be employed. Alternatively, one checksum entry may be employed for EPLs that can only display either price or promotional information. Alternatively, two checksum entries, one for price and one for promotional information, nay be employed, particularly for EPLs capable of displaying prices and promotional information simultaneously.

PLU data file 46 includes a line entry for each item sold in the transaction establishment. Each line entry has at least an item identification entry (ITEM ID) and a PLU price entry (PLU PRICE). Some line entries additionally include promotional information entries (PROMOTIONAL DATA) if promotional information is stored within PLU data file 46.

Entry ITEM ID identifies a store item. Entry PLU PRICE identifies the price read by POS system 14 to determine the price of each item during scanning by bar code reader 18. Entry PROMOTIONAL DATA identifies promotional information associated with certain items.

During normal operation, EPL terminal 24 obtains price and promotional information from PLU data file 46, or some other source file and sends it to data registers 54. Display 56 displays the price and promotional information in data registers 54. During a mismatch situation, the promotional information from PLU data file 46 does not agree with the promotional information displayed by the EPL. EPL promotional information verifier software 34 compares the promotional information in PLU file 44 with the promotional information displayed by EPLs 22 by comparing entry REG4 CHECK in EPL data file 32 with a checksum value it generates from entry PROMOTIONAL DATA in PLU data file 46.

Figure 3:
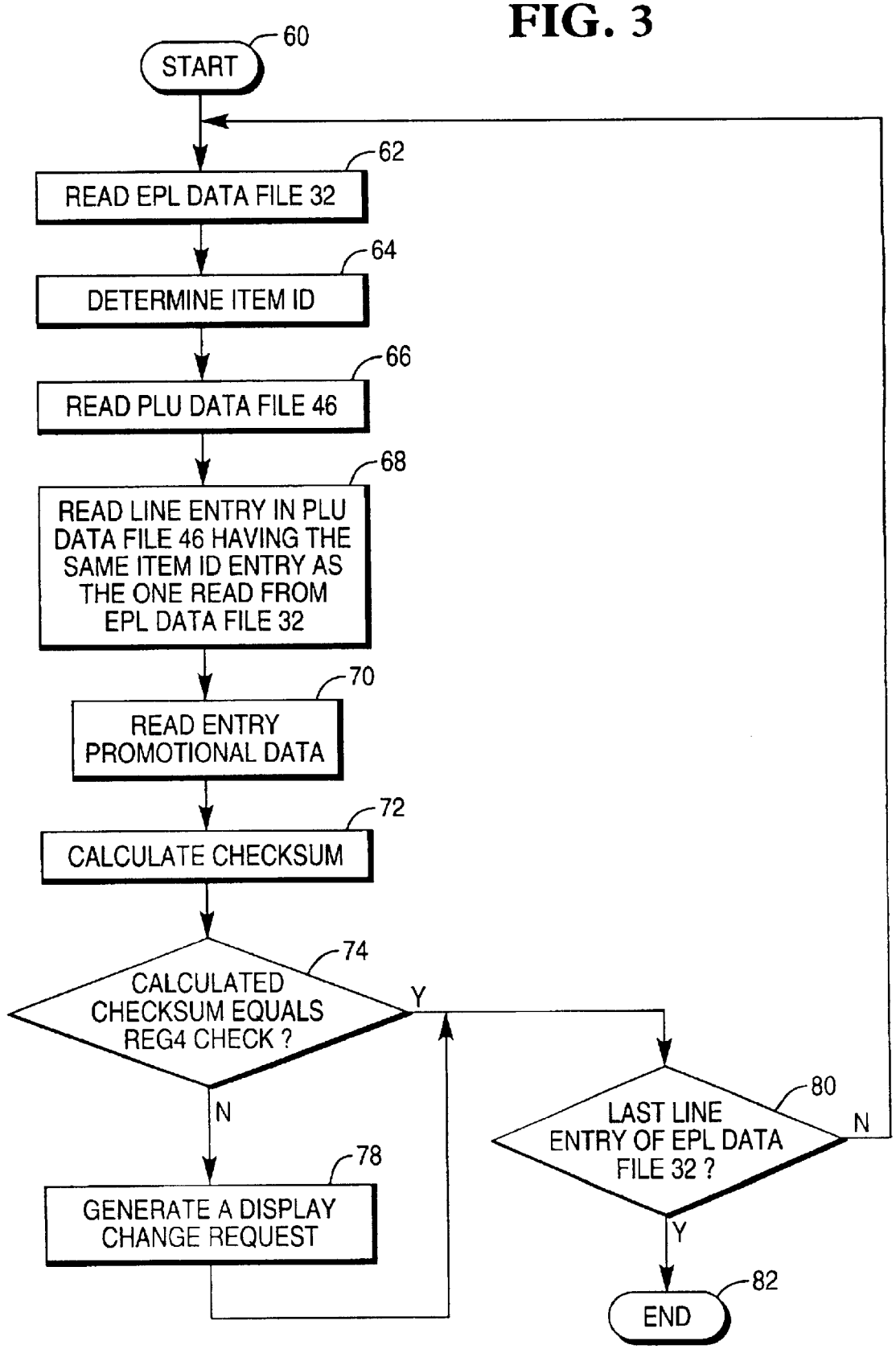
FIG. 3 is a flow diagram illustrating the method of the present invention.

Turning now to FIG. 3, the promotional information verification method of the present invention begins with START 60.

In step 62, EPL promotional information verifier software 34 reads EPL data file 32.

In step 64, EPL promotional information verifier software 34 examines entry ITEM ID.

In step 66, EPL promotional information verifier software 34 reads PLU data file 46.

In step 68, EPL promotional information verifier software 34 reads the line entry in PLU data file 46, or other promotional information source file, having the same ITEM ID entry as the one read from EPL data file 32.

In step 70, EPL promotional information verifier software 34 examines entry PROMOTIONAL DATA in the line entry from PLU data file 46, or some other source file. Entry PROMOTIONAL DATA may contain promotional information or no data.

In step 72, EPL promotional information verifier software 34 calculates a checksum value for PROMOTIONAL DATA.

In step 74, EPL promotional information verifier software 34 compares the calculated checksum value for entry PROMOTIONAL DATA with the entry REG4 CHECK. If the calculated checksum value is not the same as the REG4 CHECK entry, the promotional information for the item having ITEM ID is not the same in both EPL data file 32 and PLU data file 46. A mismatch has occurred between the promotional information displayed by the EPL and the promotional information that should be displayed by the EPL. A mismatch also occurs if no promotional information should be displayed, but is displayed, or vise versa.

In step 7S, EPL promotional information verifier software 34 generates a display change request message for changing the displayed promotional informed ion to the contents of entry PROMOTIONAL DATA in PLU data file 46 and updates the checksum value in entry REG4 CHECK in EPL data file 32. This message may by scheduled for immediate delivery or added to a batch of messages.

In step 80, the method determines whether the last line entry of EPL, data file 32 has been read. If so, the method ends at step 82. If not, the method returns to step 62 to read another line entry from EPL data file 32.

Returning to step 74, if the calculated checksum value is the same as the REG4 CHECK entry, the promotional information for the item having ITEM ID is the same in both EPL data file 32 and PLU data file 46. A mismatch has not occurred between the displayed promotional information and contents of entry PROMOTIONAL DATA in PLU data file 46. The method proceeds to step 80.

The EPL promotional information verification method of the present invention may be performed at any time. It is preferable to perform the promotional information verification method after a loss of either the EPL data file or the PLU data file. It would also be desirable to periodically perform the promotional information verification method, such as daily.

Although the present invention has been described with particular reference to certain preferred embodiments thereof, variations and modifications of the present invention can be effected within the spirit and scope of the following claims.

We claim:

1. A method of ensuring that promotional information for an item obtained from a promotional information file is equal to other promotional information assigned to an electronic price label for the item for display by the electronic price label, comprising the steps of:
   (a) reading an electronic price label data file to obtain identification information and a promotional information verifier for the item;
   (b) reading the promotional information file to obtain the promotional information for the item using the identification information obtained from the electronic price label data file;
   (c) calculating another promotional information verifier from the promotional information in the promotional information file;
   (d) comparing the one and the other promotional information verifiers to determine whether they are equal; and
   (e) assigning the promotional information from the promotional information file to the electronic price label if the one and the other promotional information verifiers are different.

2. The method as recited in claim 1, further comprising the substeps of:
   (f) storing the promotional information in a price look-up (PLU) file; and
   (g) establishing the PLU file as the promotional information file prior to step (a).

3. The method of claim 1 wherein step (e) further comprises the substep of:
   transmitting a display change request message to the electronic price label instructing the electronic price label to change the displayed promotional information to the promotional information contained in the promotional information file, if the one and the other promotional information verifiers are different.

4. The method of claim 3 wherein step (e) further comprises the substep of:
   updating the promotional information verifier in the electronic price label data file, if the one and the other promotional information verifiers are different.

5. The method of claim 1 wherein the promotional information verifier is a checksum of the promotional information assigned to the electronic price label.

6. A method of ensuring that promotional information for an item obtained from a promotional information file is equal to other promotional information assigned to an electronic price label for the item for display by the electronic price label, comprising the steps of:
   (a) providing an electronic price label data file including a record associated with the electronic price label;
   (b) storing identification information for the item in the record;
   (c) determining a promotional information checksum value for the item from the assigned promotional information;
   (d) storing the promotional information checksum value in the electronic price label data file;
   (e) reading the record in the electronic price label data file to obtain the identification information and the promotional information checksum value for the item;
   (f) reading the promotional information file to obtain the promotional information for the item using the identification information obtained from the electronic price label data file;
   (g) calculating another promotional information checksum value from the promotional information for the item in the promotional information file;
   (h) comparing the one and the other promotional information checksum values to determine whether the one and the other price checksum values are equal;
   (i) if the one and the other promotional information verifiers are different,
      (i-1) assigning the promotional information from the promotional information file to the electronic price label; and
      (i-2) instructing the electronic price label to display the promotional information from the promotional information file.

7. The method of claim 6 further comprising the substep of:
   (i-3) storing the other promotional information checksum value in the record of the electronic price label data file.

8. A system for ensuring that promotional information for an item obtained from a promotional information file is equal to other promotional information assigned to an electronic price label (EPL) for the item for display by the EPL, comprising:
   a computer system coupled to the EPL, including a terminal and a storage medium coupled to the terminal;
   wherein the storage medium contains an EPL data file, which contains identification information and a promotional information verifier for the item;
   wherein the computer terminal reads the promotional information file to obtain the promotional information for the item, calculates another promotional information verifier from the promotional information in the promotional information file, reads the EPL data file to obtain the one promotional information verifier, compares the one and the other promotional information verifiers to determine whether they are equal, and, if the one and the other promotional information verifiers are different, assigns the promotional information from the promotional information file to the electronic price label, and instructs the electronic price label to display the promotional information from the promotional information file.

9. The system of claim 8 wherein the computer terminal updates the electronic price label data file with the other promotional information verifier.

10. A system for ensuring that promotional information for an item obtained from a promotional information file is equal to other promotional information assigned to an electronic price label (EPL) for the item for display by the EPL, comprising:

a computer system coupled to the EPL, including a terminal and a storage medium coupled to the terminal;

wherein the storage medium contains an EPL data file including a record associated with the EPL;

wherein the computer terminal stores identification information for the item in the record, determines a promotional information checksum value for the item from promotional information displayed by the EPL, stores the promotional information checksum value in the EPL data file, reads the record in the EPL data file to obtain the identification information and the promotional information checksum value for the item, reads the promotional information file to obtain the promotional information for the item using the identification information obtained from the electronic price label data file, calculates another promotional information checksum value from the promotional information in the promotional information file, compares the one and the other promotional information checksum values to determine whether the one and the other promotional information checksum values are equal, and changes the displayed promotional information to the promotional information if the one and the other promotional information checksum values are different.

11. The system of claim 10 wherein the computer terminal updates the record with the other promotional information checksum value, if the one and the other promotional information checksum values are different.

12. A method of ensuring that promotional information for an item obtained from a promotional information file is equal to other promotional information assigned to an electronic price label for the item for display by the electronic price label, comprising the steps of:

(a) reading an electronic price label data file to obtain identification information and the other promotional information for the item;

(b) reading the promotional information file to obtain the promotional information for the item using the identification information obtained from the electronic price label data file;

(d) comparing the promotional information from the promotional information file to the other promotional information from the electronic price label data file to determine whether they are equal; and (e) assigning the promotional information from the promotional information file to the electronic price label if the promotional information from the promotional information file and the other promotional information from the electronic price label data file are different.

13. A electronic price label (EPL) system comprising:

an EPL associated with an item and displaying promotional information relating to the item, the EPL including an EPL register storing the promotional information; and a host computer system including a first record containing a checksum of the promotional information stored in the EPL register, and a second record containing second promotional information, the host computer system operating to calculate a checksum of the second promotional information and to determine if the checksum contained in the first record is equal to the calculated checksum.

14. The EPL system of claim 13 wherein the host computer transmits a display change request message to the electronic price label instructing the electronic price label to change the displayed promotional information, if the checksum contained in the first record is not equal to the calculated checksum.

15. The EPL system of claim 14 wherein the display change request message instructs the electronic price label to display the second promotional information.

16. The EPL system of claim 15 wherein the EPL receives the display change request message and updates the register with the second promotional information.

17. The EPL system of claim 16 wherein the host computer updates the first record with the calculated checksum, if the checksum contained in the first record is not equal to the calculated checksum.

18. The EPL system of claim 17 wherein the first record is contained in an EPL data file.

19. The EPL system of claim 18 wherein the second record is contained in a price look up (PLU) file.

20. The EPL system of claim 19 wherein the PLU file contains an entry for each item sold in a transaction establishment.

21. The EPL system of claim 20 wherein the EPL data file contains an entry for each EPL in the EPL system.

* * * * *